US012715131B2

(12) United States Patent
Lee et al.

(10) Patent No.: US 12,715,131 B2
(45) Date of Patent: Aug. 25, 2026

(54) ROBOT AND CONTROL METHOD THEREOF

(71) Applicant: SAMSUNG ELECTRONICS CO., LTD., Suwon-si (KR)

(72) Inventors: Jaeha Lee, Suwon-si (KR); Joonah Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 529 days.

(21) Appl. No.: 17/728,459

(22) Filed: Apr. 25, 2022

(65) Prior Publication Data

US 2022/0241970 A1 Aug. 4, 2022

Related U.S. Application Data

(63) Continuation of application No. PCT/KR2021/014682, filed on Oct. 20, 2021.

(30) Foreign Application Priority Data

Oct. 20, 2020 (KR) ........................ 10-2020-0136334
Feb. 26, 2021 (KR) ........................ 10-2021-0026715

(51) Int. Cl.
*B25J 9/16* (2006.01)

(52) U.S. Cl.
CPC ............. *B25J 9/1666* (2013.01); *B25J 9/163* (2013.01); *B25J 9/1661* (2013.01); *B25J 9/1697* (2013.01)

(58) Field of Classification Search
CPC ........ B25J 9/1666; B25J 9/163; B25J 9/1661; B25J 9/1697
See application file for complete search history.

(56) References Cited

U.S. PATENT DOCUMENTS

| | | | |
|---|---|---|---|
| 7,702,420 | B2 | 4/2010 | Goto et al. |
| 8,460,220 | B2 | 6/2013 | Cuddihy |
| 9,877,680 | B1 | 1/2018 | Giuffrida et al. |
| 10,016,896 | B2 | 7/2018 | Sinyavskiy et al. |
| 10,175,688 | B2 | 1/2019 | Shin et al. |

(Continued)

FOREIGN PATENT DOCUMENTS

| | | | |
|---|---|---|---|
| CN | 103519819 | B | 8/2016 |
| JP | 2006-48666 | A | 2/2006 |

(Continued)

OTHER PUBLICATIONS

3600 STIC English translation of KR-20160088638-A. (Year: 2016).*

(Continued)

*Primary Examiner* — Jason Holloway
*Assistant Examiner* — Christopher A Buksa
(74) *Attorney, Agent, or Firm* — Sughrue Mion, PLLC

(57) ABSTRACT

A robot and a control method thereof is disclosed. The robot includes a sensor; a motor; and a processor configured to: identify a user based on data obtained through the sensor; identify a position based on a user position of the user and a movement direction of the user, the position being identified from among a plurality of positions located a pre-set distance from the user position; control the motor to move the robot to the position; and obtain gait data corresponding to the user based on the data obtained through the sensor while tracking legs of the user.

13 Claims, 17 Drawing Sheets

(56) References Cited

U.S. PATENT DOCUMENTS

| | | | | |
|---|---|---|---|---|
| 10,383,552 | B2 | 8/2019 | Martinson et al. | |
| 10,448,867 | B2 | 10/2019 | Sales et al. | |
| 11,858,143 | B1 * | 1/2024 | Liu | G06F 18/2113 |
| 2014/0018705 | A1 | 1/2014 | Wang et al. | |
| 2017/0303825 | A1 | 10/2017 | Martinson et al. | |
| 2018/0181137 | A1 | 6/2018 | Choi et al. | |
| 2021/0101283 | A1 * | 4/2021 | Shin | B25J 9/161 |
| 2021/0109537 | A1 * | 4/2021 | Li | G05D 1/0221 |
| 2022/0331028 | A1 * | 10/2022 | Sternitzke | G05D 1/0094 |

FOREIGN PATENT DOCUMENTS

| | | | |
|---|---|---|---|
| JP | 2016-73630 | A | 5/2016 |
| JP | 2017-196414 | A | 11/2017 |
| JP | 6466139 | B2 | 2/2019 |
| JP | 6551455 | B2 | 7/2019 |
| JP | 2019-179456 | A | 10/2019 |
| KR | 10-1014531 | B1 | 2/2011 |
| KR | 10-2015-0113671 | A | 10/2015 |
| KR | 20160088638 | A * | 7/2016 |
| KR | 10-2017-0087384 | A | 7/2017 |
| KR | 10-1780596 | B1 | 9/2017 |
| KR | 10-2019-0024962 | A | 3/2019 |

OTHER PUBLICATIONS

International Seach Report (PCT/ISA/210) issued Feb. 7, 2022 by the International Searching Authority in counterpart International Application No. PCT/KR2021/014682.

Written Opinion (PCT/ISA/237) issued Feb. 7, 2022 by the International Searching Authority in counterpart International Application No. PCT/KR2021/014682.

Communication issued on Sep. 12, 2025 by the Korean Intellectual Property Office in Korean Patent Application No. 10-2021-0026715.

* cited by examiner

Figure 14A:
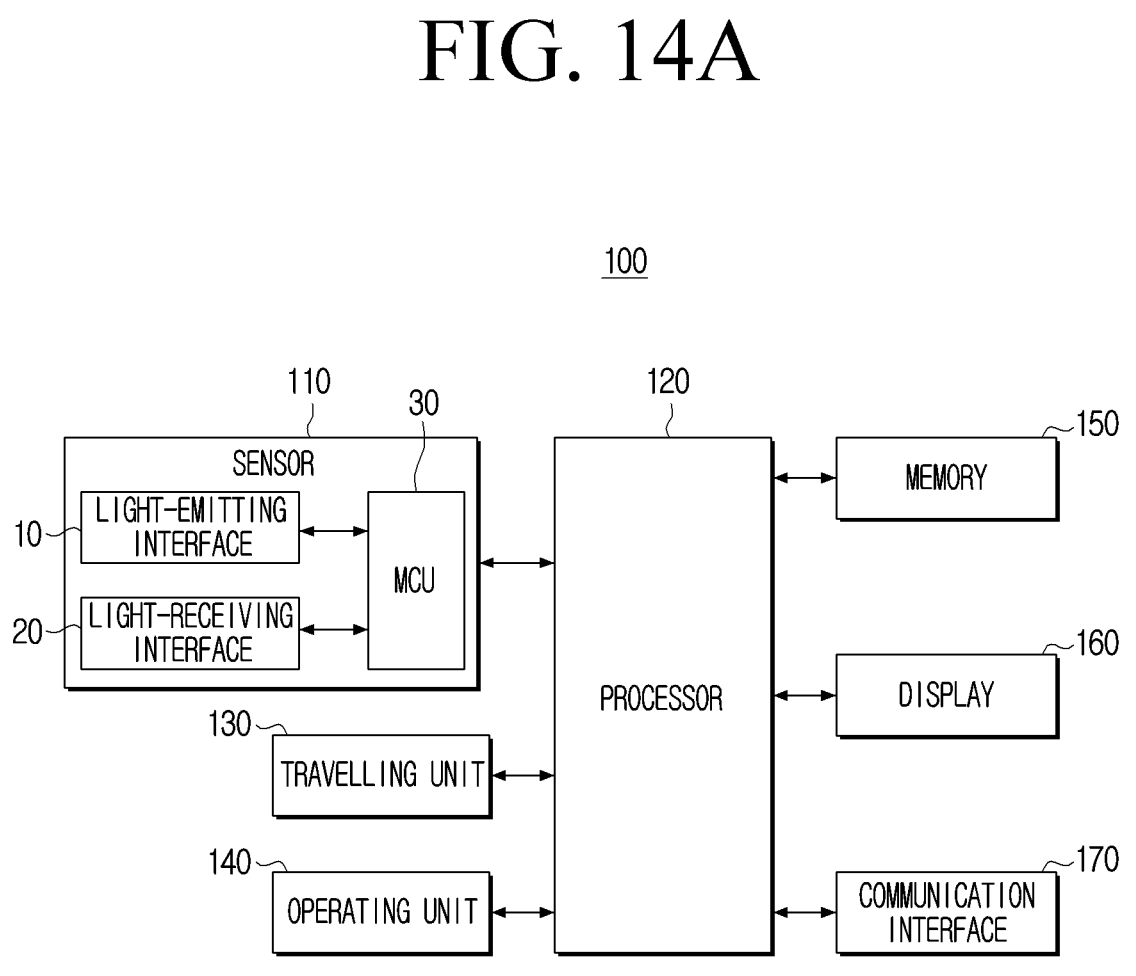

110
30
120
SENSOR
LIGHT-EMITTING INTERFACE
LIGHT-RECEIVING INTERFACE
MCU
10
20
PROCESSOR
130
TRAVELLING UNIT
140
OPERATING UNIT
MEMORY
150
DISPLAY
160
COMMUNICATION INTERFACE
170

ROBOT AND CONTROL METHOD THEREOF

CROSS-REFERENCE TO RELATED APPLICATION(S)

This application is a bypass continuation of International Application No. PCT/KR2021/014682, filed on Oct. 20, 2021, which is based on and claims priority to Korean Patent Application No. 10-2020-0136334, filed on Oct. 20, 2020, in the Korean Intellectual Property Office, and Korean Patent Application No. 10-2021-0026715, filed on Feb. 26, 2021, in the Korean Intellectual Property Office, the disclosures of which are incorporated by reference herein in their entireties.

BACKGROUND

1. Field

The disclosure relates to a robot and a control method thereof. More particularly, the disclosure relates to a robot configured to obtain gait data and a control method thereof.

2. Description of the Related Art

A gait may be a continuous motion of using two legs to move a human body from one place to another place, and because the gait is related to a nervous system, such as a motor nervous system and a central nervous system, when there are abnormalities in the nervous system, a gait may exhibit an abnormal pattern.

Accordingly, in order to analyze a physical condition of a user, there has recently been a growing need for gait analysis in the field of medicine or in the field of rehabilitation.

However, gait analysis devices of the related art merely perform analysis of the gait of the user from a fixed position, and can obtain gait data on the user being in only a restricted space.

SUMMARY

One or more embodiments may address at least the above-mentioned problems and/or disadvantages, and may provide at least the advantages described below. Accordingly, in accordance with an aspect of the disclosure, a robot may analyze a gait of a user while moving to an optimal position for gait analysis.

According to embodiments of the disclosure, a robot includes: a sensor; a motor; and a processor configured to: identify a user based on data obtained through the sensor; identify a position based on a user position of the user and a movement direction of the user, the position being identified from among a plurality of positions located a pre-set distance from the user position; control the motor to move the robot to the position; and obtain gait data corresponding to the user based on the data obtained through the sensor while tracking legs of the user.

The processor may be configured to predict a next user position of the user by applying a Kalman filter to the user position, and identify the movement direction of the user based on the user position and the predicted next user position.

The processor may be configured to: identify whether an obstacle is positioned between the robot and the identified position based on map data obtained through the sensor; identify a different position at which the obstacle is not positioned between the robot and the different position, from among the plurality of positions; and control the motor to move the robot to the different position.

The processor may be configured to: identify the movement direction of the user based on the data obtained through the sensor; identify a left leg of the user based on the movement direction; and identify a right leg of the user based on the movement direction.

The processor may be configured to: identify the position based on the position intersecting the movement direction; control the motor to move the robot from the position in the movement direction; and obtain the gait data while controlling the motor to move the robot in the movement direction.

The processor may be configured to: obtain a Voronoi Diagram by applying a thinning algorithm to map data obtained through the sensor; and identify the plurality of positions based on the Voronoi Diagram.

The processor may be configured to: generate a virtual skeleton by applying a 3D modeling program to the data corresponding to the user obtained from the sensor; and obtain the gait data of the user based on a gait posture of the virtual skeleton.

The processor may be configured to: identify a plurality of parameter values of a plurality of parameters based on the gait data; compare the plurality of parameter values with information about a plurality of gait patterns corresponding to a plurality of pre-stored diseases; obtain disease information corresponding to a gait of the user; and provide the disease information.

According to embodiments of the disclosure, a method of controlling a robot includes: identifying a user position based on data obtained through a sensor; identify a position based on a user position of the user and a movement direction of the user, the position being identified from among a plurality of positions located a pre-set distance from the user position; controlling the robot to move to the identified position; and obtaining gait data corresponding to the user based on the data obtained through the sensor while tracking legs of the user.

The method may further include: applying a Kalman filter to the user position to predict a next user position of the user; and identifying the movement direction of the user based on the user position and the predicted next user position.

The method may further include: identifying whether an obstacle is positioned between the robot and the identified position based on map data obtained through the sensor; identifying a different position at which the obstacle is not positioned between the robot and the different position, from among the plurality of positions; and controlling the robot to move to the different position.

The method may further include: identifying the movement direction of the user based on the data obtained through the sensor; identifying a left leg of the user based on the movement direction; and identifying a right leg of the user based on the movement direction.

The method may further include: identifying the position based on the position intersecting the movement direction; controlling the robot to move from the position in the movement direction; and obtaining the gait data while controlling the robot to move in the movement direction.

The method may further include: applying a thinning algorithm to map data obtained through the sensor to obtain a Voronoi Diagram; and identifying the plurality of positions based on the Voronoi Diagram.

The method may further include: applying a 3D modeling program to the data corresponding to the user that is obtained from the sensor to generate a virtual skeleton; and obtaining the gait data of the user based on a gait posture of the virtual skeleton.

According to the one or more embodiments, a robot analyzing a gait of a user while moving to an optimal position for gait analysis and a control method thereof may be provided.

BRIEF DESCRIPTION OF THE DRAWINGS

FIG. 14A is a block diagram illustrating a robot according to an embodiment;

DETAILED DESCRIPTION

Embodiments of disclosure will be described in with reference to the accompanying drawings. The disclosure may, however, be embodied in many different forms and should not be construed as being limited to the examples set forth herein.

Terms used in used in describing embodiments of the disclosure are general terms selected considering their function herein. However, the terms may change depending on intention, legal or technical interpretation, emergence of new technologies, and the like of those skilled in the related art. Further, there may be terms arbitrarily selected, and in this case, the meaning of the term may be interpreted to the meaning as defined in the description, and if there is no specific meaning of the term described, the term may be interpreted based on the overall context of the disclosure and technical common sense in the art.

In addition, in describing the disclosure, in case it is determined that the detailed description of related known technologies may unnecessarily confuse the gist of the disclosure, the detailed description will be omitted.

Further, it is to be understood that the disclosure is not limited by the specific embodiments disclosed herein.

Figure 1:
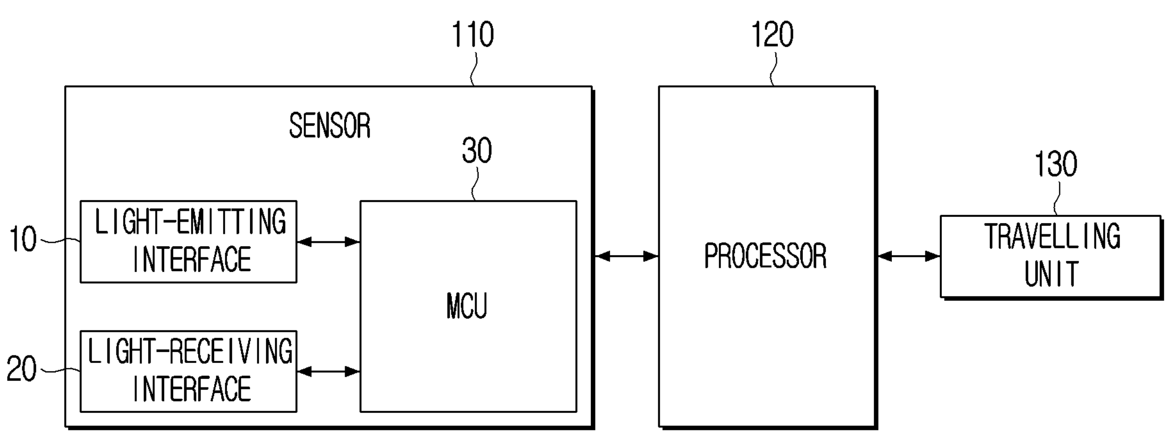
FIG. 1 is a block diagram illustrating a robot according to an embodiment.

FIG. 1 is a block diagram illustrating a robot according to an embodiment.

Referring to FIG. 1, the robot 100 according to an embodiment may include a sensor 110, a processor 120, and a travelling unit 130.

The sensor 110 may measure distances, for example a distance between the robot 100 and an object, and referring to FIG. 1, the sensor 110 according to an embodiment may be a light detection and ranging (LIDAR) sensor which includes a light-emitting interface 10, a light-receiving interface 20, and a microcontroller unit (MCU) 30. The MCU may be a hardware MCU. Here, the light-emitting interface 10 may, as an example, be an infrared (IR) light source radiating infrared rays, and the light-receiving interface 20 may, as an example, be an image sensor receiving light reflected by an object. However, this is one embodiment, and the light-emitting interface 10 of the disclosure may be implemented with various light sources which may radiate light of ultrasonic waves, laser, or the like, and the light-receiving interface 20 may be implemented with various light-receiving sensors capable of receiving light such as a red-green-blue (RGB) sensor.

The MCU 30 of the sensor 110 may be configured to control the light-emitting interface 10 to radiate light based on a control signal received from the processor 120. Further, the MCU 30 may be configured to determine the distance between the sensor 110 and the object based on time until the light is reflected by the object and received in the light-receiving interface 20 after being radiated by the light-emitting interface 10. Specifically, the MCU 30 may be configured to determine the distance between the sensor 110 and the object through a calculation distance=c*t/2 based on a speed of light c and time t until light is reflected by the object and received in the light-receiving interface 20 after being radiated by the light-emitting interface 10.

The above is one embodiment, and the MCU 30 may be configured to determine the distance between the sensor 110 and the object based on a phase change of the light received in the light-receiving interface 20. As an example, the MCU 30 may be configured to determine the distance between the sensor 110 and the object through a calculation distance=c/(2)*(Δθ/2(pi*f)) based on a speed of light c, a modulation frequency of light f, and a phase change of light Δθ.

In addition, the MCU 30 may be configured to determine an angle between the sensor 110 and the object (or, a direction the object is positioned from the sensor 110), a height of the object (or, elevation), and the like, based on a position of a pixel which received the reflected light from among a plurality of pixels forming the light-receiving interface 20. Specifically, the MCU 30 may be configured to determine a column value and a row value of a pixel which received the reflected light from among the plurality of pixels forming the light-receiving interface 20 which is arranged in a plurality of column lines and a plurality of row lines, determine an angle between the sensor 110 and the object by multiplying a pre-set first value and the determined column value, and determine a height of the object by multiplying a pre-set second value and the determined row value.

In FIG. 1, although the MCU 30 is illustrated as being included in the sensor 110, but the sensor 110 according to an embodiment may include the light-emitting interface 10 and the light-receiving interface 20, and a function of the MCU 30 described above may be performed by the processor 120. In this case, the light-emitting interface 10 may radiate light according to the control of the processor 120. Further, the processor 120 may be configured to determine the distance between the sensor 110 and the object based on the time until the light radiated by the light-emitting interface 10 is reflected by the object and received in the light-receiving interface 20, or the processor 120 may be configured to determine the distance between the sensor 110 and the object based on the phase change of light received in the light-receiving interface 20. In addition, as described above, the processor 120 may be configured to determine an angle or the like between the sensor 110 and the object based on the position of the pixel which received the reflected light from among the plurality of pixels forming the light-receiving interface 20.

The MCU 30 of the sensor 110 may be configured to generate point cloud data based on distance information and angle information corresponding to the object obtained through the above-described calculations. Here, point cloud data may be data of an object represented in a 2-dimensional or 3-dimensional space based on distance information and angle information corresponding to the object. To this end, the MCU 30 may be configured to obtain a 2-dimensional coordinate (or, a 3-dimensional coordinate) of a plurality of points (e.g., a surface of the object which reflected light) which reflects light based on distance information and angle information corresponding to the object obtained through the above-described calculations, and generate point cloud data formed of the plurality of points based on coordinate information identifying the respective points.

Further, the MCU 30 may be configured to generate map data by applying a Simultaneous Localization And Mapping (SLAM) algorithm to the point cloud data. Here, the SLAM algorithm may be an algorithm for concurrently performing map generation and position tracking, and the MCU 30 may be configured to generate map data of a global coordinate system through the SLAM algorithm. Specifically, the MCU 30 may be configured to obtain point cloud data corresponding to respective Field Of Views (FOVs) based on distance information and angle information with the objects obtained for the respective FOVs of the sensor 110. Further, the MCU 30 may be configured to determine a feature point cloud (e.g., flat surface point cloud) which may be a feature in the respective point cloud data, and generate map data of the global coordinate system by registering the plurality of point cloud data based on a similarity of the feature point cloud included in the respective point cloud data.

The function of the MCU 30 described above may be performed by the processor 120 according to an embodiment. As an example, the processor 120 may be configured to generate point cloud data based on distance information and angle information with the object obtained based on a time of flight of light or the phase change of light. In addition, the processor 120 may be configured to generate map data by applying the above-described SLAM algorithm to the point cloud data.

The processor 120 may be configured to cluster, based on point cloud data being obtained, the plurality of points forming the point cloud data into at least one cluster. Specifically, the processor 120 may be configured to calculate the distance between the respective points forming the point cloud data, and cluster the plurality of points within a distance of less than or equal to a pre-set value to one cluster. To this end, the processor 120 may be configured to calculate the distance between the respective points included in the point cloud data. Here, the distance between the respective points may be calculated by, as an example, an L2 Distance algorithm. The L2 Distance algorithm may be an algorithm calculating the distance between the respective points by using a Euclidean Norm, and as an example, if a coordinate of a first point is (p1, p2), and a coordinate of a second point is (q1, q2), the distance d between the first and second points may be calculated with root((q1−p1)^2+(q2−p2)^2). However, this is one embodiment, and the processor 120 may be configured to structuralize the 2-dimensional point cloud data into a k-dimensional (e.g., 3-dimensional) space, and calculate the distance between the respective points by applying the L2 Distance algorithm to the plurality of points included in the k-dimensional space.

The processor 120 may be configured to determine, based on at least one cluster being obtained, whether the obtained cluster is a cluster corresponding to a leg of the user. To this end, the processor 120 may be configured to calculate a score of the cluster based on a width of the cluster, a height of the cluster, and an aspect ratio of the cluster. Here, the width of the cluster may be calculated based on a horizontal distance (e.g., the distance between points positioned at both distal ends of the plurality of points on a same y-axis) of the plurality of points forming the cluster, the height of the cluster may be calculated based on a vertical distance (e.g., the distance between points positioned at both distal ends of the plurality of points on a same x-axis) of the plurality of points forming the cluster, and the aspect ratio of the cluster may be calculated based on a ratio of width and height of the cluster. Further, the score of the cluster may be a value corresponding to the similarity of legs of an actual person and the cluster, and the processor 120 may be configured to compare pre-stored leg information (here, information about an average width of legs, an average height of legs, and an average aspect ratio of legs of an actual person may be included) and cluster information (here, information about a width of a cluster, a height of a cluster, an aspect ratio of a cluster may be included), and the score of the cluster may be calculated based on the similarity of the pre-stored leg information and the cluster information. As an example, the processor 120 may be configured to increase the score of the cluster the more the width of the cluster, the height of the cluster and the aspect ratio of the cluster, are similar to the pre-stored average width of legs, the average height of legs, and the average aspect ratio of legs.

Further, the processor 120 may be configured to determine the cluster as a cluster corresponding to the leg of the user when the score of the cluster is greater than or equal to a threshold value. When it is determined that the cluster corresponds to the leg of the user, the processor 120 may calculate a corresponding center point of the cluster. Here, the center point of the cluster may, as an example, be obtained by calculating the distance between plurality of points forming the cluster and an arbitrary center point k through the L2 Distance algorithm described above, and repeatedly performing the calculation until the distance between the point calculated for the respective points and the center point k is converged to a certain value.

Based on one user being positioned within the FOV of the sensor 110, the processor 120 may be configured to obtain a first cluster corresponding to one from among a left leg or a right leg of the user, and a second cluster corresponding to a remaining leg, and obtain a center point k1 of the first cluster and a center point k2 of the second cluster. In this case, the processor 120 may be configured to calculate a center point A1 that is provided between the center point k1 and the center point k2, and allocate a person ID to the center point A1. Here, the center point A1 may be calculated through a repeated application of the L2 Distance algorithm similar to the method of calculating the center point k of the cluster described above. Further, the processor 120 may be configured to track a movement of the center point A1 to track one from among the first cluster and the second cluster as the left leg of the person ID, and identify the remaining cluster as the right leg of the person ID.

Specifically, the processor 120 may be configured to determine a direction of progress of the center point A1 based on a position of the center point A1 which is changed according to the movement of the user, determine the cluster positioned at a left side of the center point A1 based on the direction of progress as the cluster corresponding to the left leg of the user, and determine the cluster positioned at a right side of the center point A1 as the cluster corresponding to the right leg of the user. Further, the processor 120 may be configured to allocate Leg ID: Left to the cluster corresponding to the left leg of the user, and allocate Leg ID: Right to the cluster corresponding to the right leg of the user.

The processor 120 may be configured to then track the movement of the left leg and the right leg of the user to which the IDs are allocated.

Specifically, the processor 120 may be configured to track the leg movement of the user while controlling a travelling unit 130 so that the robot 100 is moved to an optimal position for observing the legs of the user. Here, the travelling unit 130 may include a driving unit and a motor connected to the driving unit, the driving unit of the travelling unit 130 may be realized as, for example, a wheel, a tread, a leg of a robot, or the like, and the motor of the travelling unit 130 may be configured to move the robot 100 by rotating according to the control of the processor 120.

Specifically, the processor 120 may be configured to apply, based on map data being generated based on the SLAM algorithm described above, a thinning algorithm to the map data. Here, the thinning algorithm may be an algorithm processing a travelable area as a line by gradually increasing a size of an untravellable area from among the untravellable area (e.g., area at which obstacles such as wall, furniture, or the like are positioned) and the travelable area included in the map data, and may, as an example, be a Zhang Suen thinning algorithm.

Further, the processor 120 may be configured to obtain a Voronoi Diagram 2 through the thinning algorithm.

Figure 2:
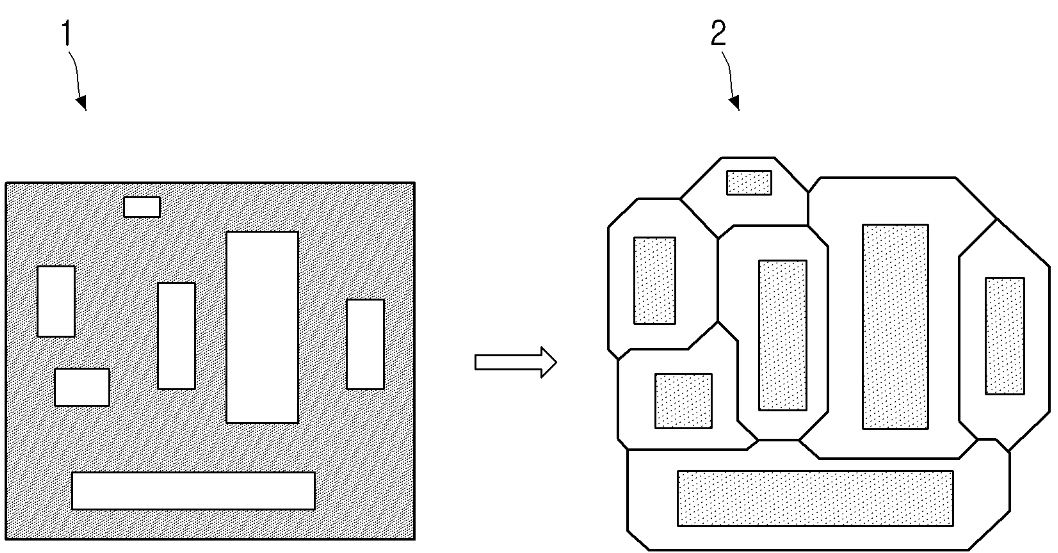
FIG. 2 is a diagram illustrating map data and a Voronoi Diagram according to an embodiment.

For example, referring to FIG. 2, the processor 120 may be configured to obtain the Voronoi Diagram 2 in which the travelable area is processed as a line by gradually increasing the size of an area corresponding to the untravellable area (shown as the white color in the map data 1) by applying the thinning algorithm to the map data 1. Here, the line of the Voronoi Diagram 2 may be a set of a plurality of nodes.

Further, the processor 120 may be configured to determine a point (or, path) for tracking the legs of the user based on the Voronoi Diagram 2.

Figure 3:
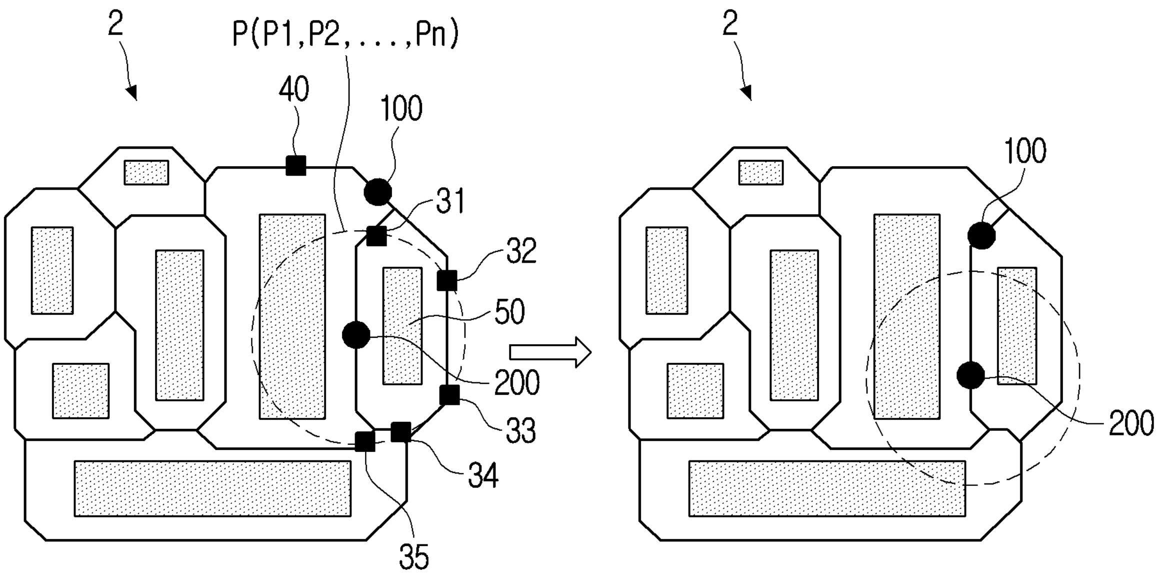
FIG. 3 is a diagram illustrating tracking legs of a user taking into consideration obstacles according to an embodiment.

Specifically, the processor 120 may be configured to set the positions corresponding a pre-set distance from the user who is the subject of observation in the Voronoi Diagram 2 as a set of reference points P, for example including reference points P1, P2, . . . , Pn. Here, the user may correspond to the center point A1 described above and the pre-set distance may be a minimum distance for detecting distance through the sensor 110. For example, based on the sensor 110 being realized as a sensor capable of detecting an object positioned at a distance of greater than or equal to 1 meter (m), the pre-set distance may be 1 m. For example, referring to FIG. 3, the processor 120 may be configured to set reference points P1, P2, . . . , Pn to the points corresponding to the pre-set distance (e.g., 1 m) from the position 200 of the user who is the subject of observation as the set of reference points P. Here, the set of reference points P may be a circular form as illustrated in FIG. 3.

Further, the processor 120 may be configured to allocate a cost to the plurality of nodes included in the Voronoi Diagram 2. Here, the plurality of nodes may be points forming the line included in the Voronoi Diagram 2. Specifically, the processor 120 may be configured to calculate a shortest distance from the set of reference points P (P1, P2, . . . , Pn) to the respective nodes of the Voronoi Diagram 2, and allocate the cost of the node with a small distance d value to be lower than the cost of the node with a large distance d value. As an example, referring to FIG. 3, the processor 120 may be configured to allocate a cost of a first node 31 positioned at a point which corresponds to one from among the set of reference points P (P1, P2, . . . , Pn) to be lower than a cost of the node 40 positioned at a point apart from the set of reference points P (P1, P2, . . . , Pn). Accordingly, the same cost may be allocated to the plurality of nodes 31, 32, 33, 34 and 35, each of which is positioned at the pre-set distance from the position 200 of the user, and corresponds to one from among the set of reference points P (P1, P2, . . . , Pn).

The processor 120 may be configured to identify whether there is a node incapable of observing the user because of an obstacle from the plurality of nodes, and allocate a maximum cost to a node that is incapable of observing the user because of the obstacle. Specifically, the processor 120 may be configured to determine the position of the obstacle based on position information about the obstacle obtained in the process of generating map data 1, and based on determining that the obstacle is positioned between the node and the user, determine the corresponding node as a node incapable of observing the user and allocate the maximum cost to the corresponding node. For example, based on the same cost being initially allocated to nodes that correspond to one from among the set of reference points P (P1, P2, . . . , Pn), the processor 120 may be configured to reallocate a maximum cost to a node that is incapable of observing the user. As an example, referring to FIG. 3, the processor 120 may be configured to initially allocate the same cost to the plurality of nodes 31, 32, 33, 34 and 35, determine that obstacle 50 is present between a second node 32 and a user position 200 based on position information of the obstacle, and reallocate the maximum cost to the second node 32.

In addition, the processor 120 may be configured to reallocate, based on the same cost being initially allocated to the plurality of nodes, a minimum cost to the node of a point which is relatively closest from the current position of the robot 100 from among the plurality of nodes. As an example, referring to FIG. 3, the first node 31, a third node 33, a fourth node 34, and a fifth node 35 may be positioned at locations corresponding to the set of reference points P (P1, P2, . . . , Pn), and the same cost may be initially allocated in that there is no obstacle positioned between the respective nodes and the user position 200. In this case, the processor 120 may be configured to reallocate the cost of the first node 31 which is the relatively closest node from the current position of the robot 100 as the minimum cost.

Further, the processor 120 may be configured to set the position to which the minimum cost is allocated from among the plurality of nodes as a target position of the robot 100, and control the travelling unit 130 to move the robot 100 to the corresponding position.

Specifically, the processor 120 may be configured to search, based on a Dijkstra Algorithm, the shortest path from the current position of the robot 100 to the target point 31. Here, the Dijkstra Algorithm may be an algorithm calculating a plurality of paths from a departure node to a target node, and determining the path with the shortest travel distance from among the plurality of paths.

Based on the searched path being a straight-line path including at least one way point (this may be a point at which the straight-line segment is bent), the processor 120 may be configured to apply a Hermite interpolation to the searched path. Here, the Hermite interpolation may be a technique of calculating a tangent vector of waypoints positioned between the departure node and the target node to change the straight-line path to a curve path, and connecting the departure node and the target node with a curve based on the tangent vector, and accordingly, the robot 100 may be able to travel in a smooth curve toward a destination.

Through the above, the processor 120 may be configured to control the robot 100 to move, as illustrated in FIG. 3, to a position corresponding to the first node 31 with the minimum cost allocated, and continue tracking the legs of the user. Accordingly, the robot 100 may be configured to obtain gait data corresponding to the user while dynamically travelling to the position at which tracking the legs of the user is possible from among the plurality of points in the surroundings of the user.

The processor 120 may be configured to predict, in tracking the user, the movement of the user through a Kalman filter, and control the travelling unit 130 to track the user by moving the robot 100 based on the predicted movement of the user. Here, the Kalman filter may be a filter estimating the position of the user at a specific point-in-time based on the position of the user at a previous point-in-time.

Figure 4:
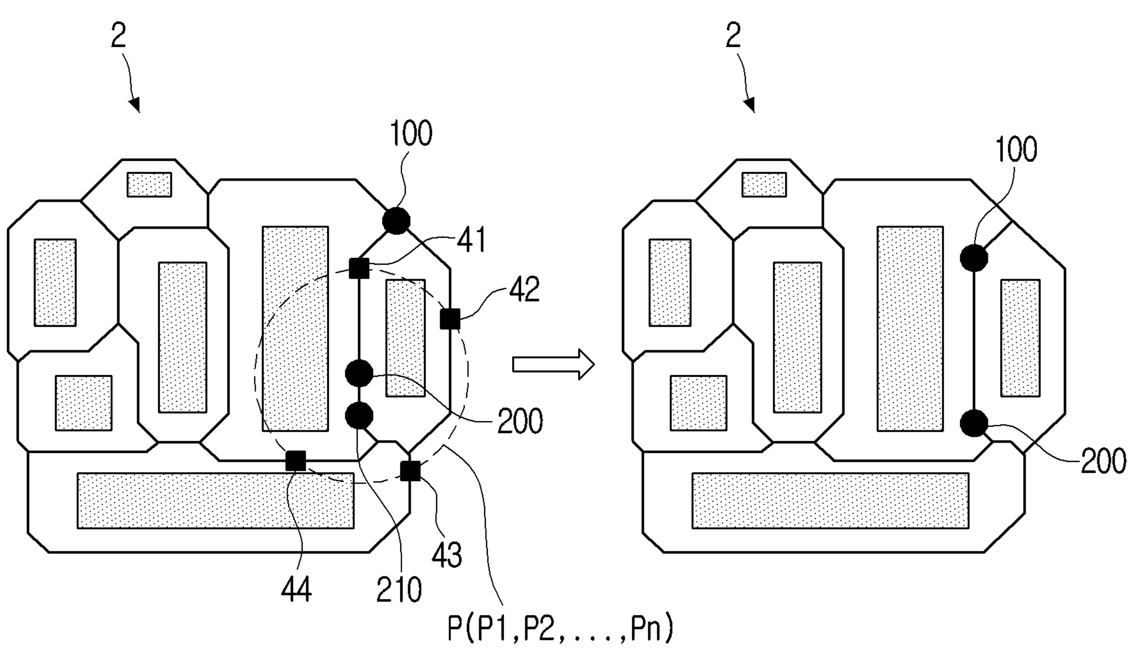
FIG. 4 is a diagram illustrating tracking legs of a user taking into consideration a movement direction of the user according to an embodiment.

For example, referring to FIG. 4, the processor 120 may be configured to obtain a state vector corresponding to the position 210 of the user at a future point-in-time by applying the Kalman filter to a state vector corresponding to the position 200 of the user at the current point-in-time. Further, the processor 120 may be configured to allocate a cost to the respective nodes of the Voronoi Diagram 2 based on the position 210 of the user at the future point-in-time determined based on the obtained state vector.

Specifically, the processor 120 may be configured to predict the movement direction of the user based on the position 200 of the user at the current point-in-time and the position 210 of the user at the future point-in-time, and allocate a minimum cost to the node positioned in the same direction as the movement direction of the user from among the plurality of nodes determined based on the set of reference points P (P1, P2, . . . , Pn). That is, the processor 120 may be configured to allocate the minimum cost to the node with a viewpoint for tracking the legs of the user while moving in the same direction as the movement direction of the user from behind the user or the node with a viewpoint for tracking the legs of the user while moving in the same direction as the movement direction of the user from the front of the user. As an example, if the user has been predicted to move in a downward direction based on the position 210 of the user at the future point-in-time as in FIG. 4, the processor 120 may be configured to allocate the minimum cost to node 41 from among the plurality of nodes 41, 42, 43 and 44 which correspond to the set of reference points P (P1, P2, . . . , Pn) to travel in the same direction as the movement direction of the user.

Further, the processor 120 may be configured to set node A 41 to which the minimum cost is allocated as the next target position of the robot 100, and control the travelling unit 130 to move the robot 100 to the corresponding position.

Accordingly, the robot 100 may be configured to obtain gait data by moving in the same direction as the movement direction of the user from behind the user, or obtain gait data by moving in the same direction as the movement direction of the user from the front of the user. Embodiments are not limited thereto, and as discussed below, it gait data of the user is obtained from a side surface, because obtaining data suitable for gait analysis is difficult as the remaining leg is hidden by the leg relatively closer with the robot 100, the robot 100 may obtain optimal data for gait analysis.

The processor 120 may be configured to determine the position for tracking the legs of the user taking into consideration both the movement direction of the user and obstacle information.

Figure 5:
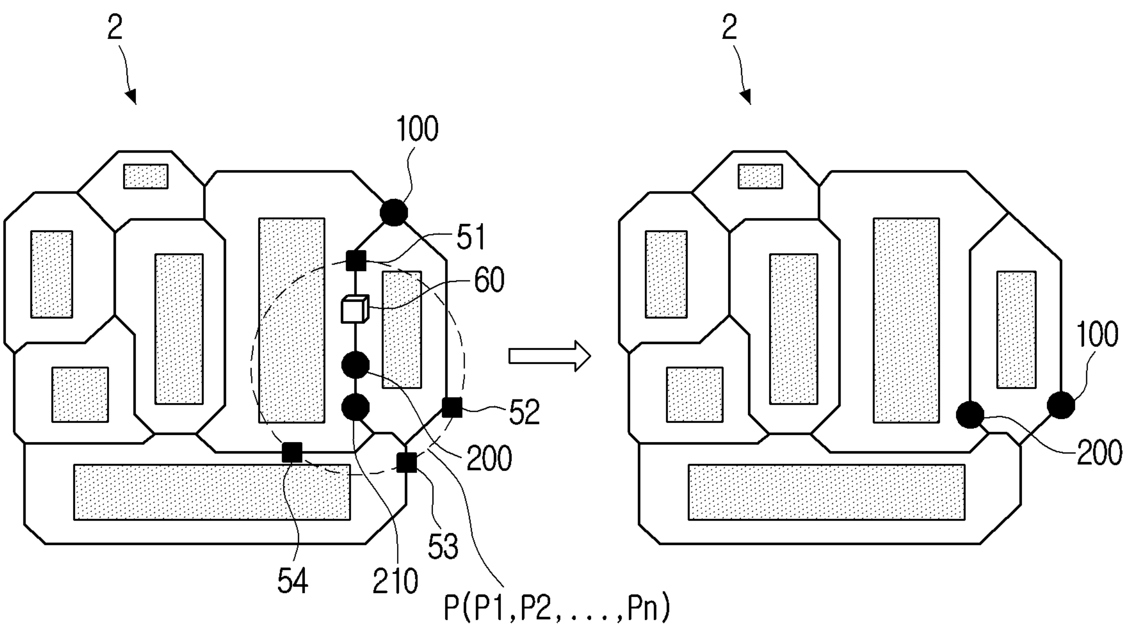
FIG. 5 is a diagram illustrating tracking legs of a user taking into consideration a movement direction of the user and obstacles according to an embodiment.

As an example, referring to FIG. 5, the processor 120 may be configured to identify a set of reference points P (P1, P2, . . . , Pn) positioned at a pre-set distance from the position 200 of the user based on the position 200 of the user. Further, the processor 120 may be configured to determine the plurality of nodes (e.g., a first node 51, a second node, third node 53, and a fourth node 54 in FIG. 5) positioned at the set of reference points P (P1, P2, . . . , Pn). Further, the processor 120 may be configured to determine the movement direction of the user based on the current position 200 of the user and the predicted position 210 of the user based on the Kalman filter. Further, the processor 120 may be configured to determine whether an obstacle 60 is present between the robot 100 and the position 200 of the user based on map data which is generated by the sensor 110 through the SLAM algorithm. For example, the obstacle may be a static obstacle such furniture or a dynamic obstacle that moves such as an animal. To this end, the processor 120 may be configured to recognize an object having a shape different from the shape of a leg which is the subject for tracking as an obstacle.

If it is determined that an obstacle 60 is present between the robot 100 and the position 200 of the user, the processor 120 may be configured to allocate a maximum cost to the first node 51, which is not able to provide a suitable viewpoint for obtaining gait data due to the obstacle 60. Further, the processor 120 may be configured to allocate a minimum cost to the second node 52 positioned relatively closest from the current position of the robot 100 from among the plurality of nodes 52, 53 and 54, and control the travelling unit 130 to move the robot 100 to the second node 52 to which the minimum cost is allocated.

Accordingly, by determining the position for tracking the legs of the user taking into consideration both the movement direction of the user and obstacle information, the disclosure enables gait data corresponding to the user to be obtained while dynamically moving the robot 100 to an optimal position where the legs of the user may be tracked.

Figure 6:
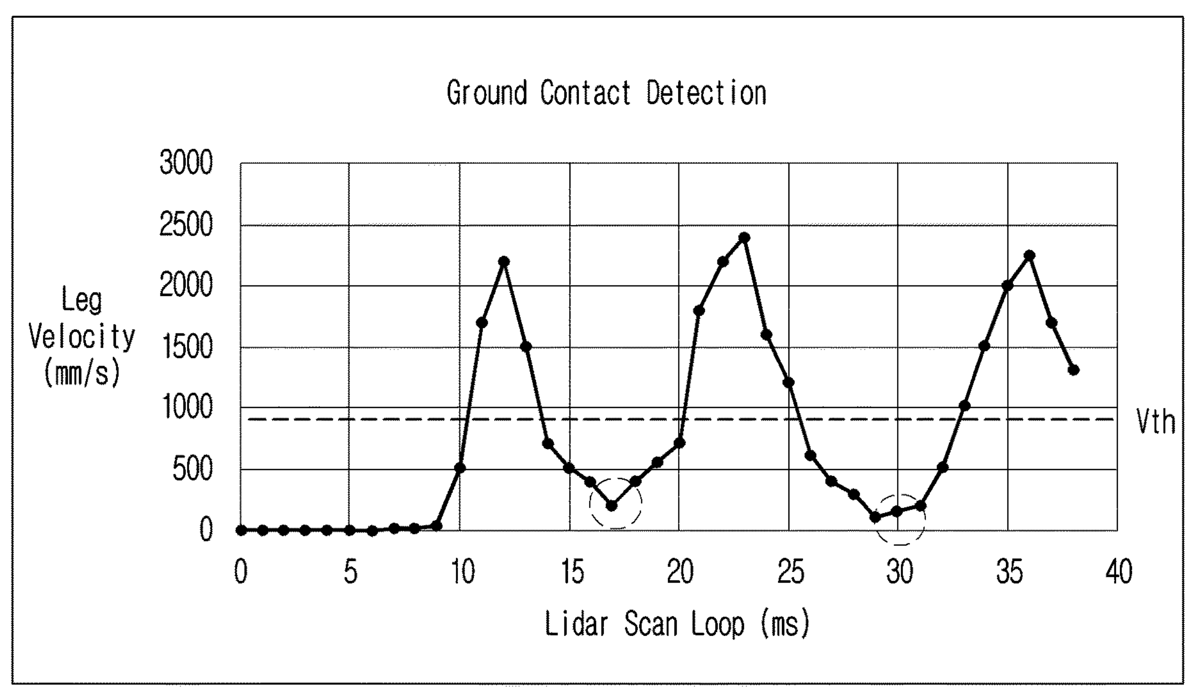
FIG. 6 is a diagram illustrating gait data according to an embodiment.

FIG. 6 is a diagram illustrating gait data according to an embodiment.

The processor 120 may be configured to obtain gait data corresponding to the user while dynamically travelling to the optimal position where the legs of the user may be tracked through the method described above. Here, gait data may include a first gait data which is obtained through tracking a cluster allocated to the left leg of the user, that is, allocated with Leg ID: Left described above, and a second gait data which is obtained through tracking a cluster allocated to the right leg of the user, that is, allocated with Leg ID: Right described above. For convenience of description, the first gait data corresponding to the left leg of the user has been described as an example below, but the technical idea may also be applicable to the second gait data corresponding to the right leg of the user.

FIG. 6 is a diagram illustrating gait data according to an embodiment which is obtained through tracking the left leg of the user. Referring to FIG. 6, the processor 120 may be configured to obtain gait data including information about a movement speed of the left leg through the tracking of the left leg of the user. To this end, the processor 120 may be configured to determine the position of the leg which is measured every a pre-set time T interval by the sensor 110, and determine a movement speed of the leg through calculation based on time T and position change of the legs. For example, the pre-set time T interval may be 1 ms.

Further, the processor 120 may be configured to determine a segment of the gait data where the legs are in movement slower than a pre-set speed Vth as a stance segment, and determine a segment of the gait data where the legs are in movement faster than a pre-set speed Vth as a swing segment. Here, the stance segment may be a segment from the point-in-time at which a heel of a foot contacts a ground surface to the point-in-time at which a toe steps off from the ground surface, and the swing segment may be a segment from the point-in-time the toe steps off from the ground surface to the point-in-time the heel of the foot contacts the ground surface. As an example, referring to FIG. 6, the processor 120 may be configured to determine, with the exception of 0 to 9 ms segment which is the segment without speed change, the segment from 9 ms which is the segment where speed change occurred according to the user moving for gait to the segment the legs are moved slower than the pre-set speed Vth as the stance segment, and determine the segment the legs are moved faster than the pre-set speed Vth as the swing segment. For example, with reference to FIG. 6, the time periods from 9 ms to 10 ms, from 14 ms to 20 ms, and from 26 ms to 32 ms may be determined as the stance segments, and the timer periods from 11 ms to 13 ms, from 21 ms. to 25 ms, and from 33 ms to 38 ms as the swing segments. Further, the processor 120 may be configured to determine a moving distance corresponding to the stance segment based on distance information measured by the sensor 110 while in the stance segment, and determine a moving distance corresponding to the swing segment based on distance information measured by the sensor 110 while in the swing segment. In addition, the processor 120 may be configured to determine the combined time of the stance segment and the swing segment as a stride segment, and determine the combined distance of the moving distance in the stance segment and the moving distance in the swing segment as a stride of the user.

In addition, the processor 120 may be configured to obtain, similarly to the above, gait data including information about the moving speed of the right leg through tracking of the right leg of the user, and determine the swing segment of the right leg, the stance segment, the stride segment, the moving distance corresponding to swing segment, the moving distance corresponding to the stance segment, and stride.

The above-described swing segment, stance segment, stride segment, moving distance corresponding to swing segment, moving distance corresponding to the stance segment, and stride may be gait parameters according to an embodiment, and the processor 120 may be configured to obtain information about various gait parameters in addition to the above. As an example, the processor 120 may be configured to obtain a number of steps per minute (cadence) of the user based on the stride segment and the stride, a step time of adding the stride segment of the left leg and the stride segment of the right leg, a sensing value obtained by a sensor 110 while the user is walking, a movement trajectory of the determined leg based on distance information between the legs, and the like as gait parameters.

The processor 120 may be configured to determine whether the gait of the user is a normal gait or an abnormal gait based on a parameter value of one or more of the obtained gait parameters. Specifically, the processor 120 may be configured to determine whether the gait of the user is a normal gait or an abnormal gait based on a comparison of information about the gait pattern pre-stored in the memory and a parameter value of the obtained gait parameters. Here, the information about the pre-stored gait pattern may include information about a first gait pattern generated based on a gait analysis of a typical user and information about a second gait pattern generated based on a gait analysis of a user with a disease such as Parkinson's, hemiplegia, and the like. Further, information about the first gait pattern may include a plurality of parameter values corresponding to a plurality of parameters obtained based on the gait analysis of the typical user, and information about the second gait pattern may include a plurality of parameter values corresponding to a plurality of parameters obtained based on the gait analysis of the user with a disease. Specifically, the information about the second gait pattern may include information about the plurality of parameter values corresponding to the respective disease. As an example, the information about the second gait pattern may include a plurality of first parameter values corresponding to a hemiplegic gait and a plurality of second parameter values corresponding to a parkinsonian gait.

Further, the processor 120 may be configured to provide information about the gait analysis result. Specifically, the processor 120 may be configured to compare the plurality of parameter values corresponding to the plurality of parameters included in the information about the first gait pattern with the plurality of parameter values of the plurality of parameters obtained through the gait analysis of the user. Further, the processor 120 may be configured to determine, based on the plurality of parameter values corresponding to the plurality of parameters included in the information about the first gait pattern and the plurality of parameter values of the plurality of parameters obtained through the gait analysis of the user being determined as matching by a threshold value or more, the gait of the user as a normal gait, and provide information that the gait of the user is a normal gait. In addition, the processor 120 may be configured to compare the plurality of parameter values corresponding to the respective diseases included in the information about the second gait pattern with the plurality of parameter values of the plurality of parameters obtained through the gait analysis of the user, and determine the disease corresponding to the gait of the user. As an example, the processor 120 may be configured to determine, based on the plurality of parameter values corresponding to a hemiplegic gait and the plurality of parameter values of the plurality of parameters obtained through the gait analysis of the user being determined as matching by a threshold value or more, the gait of the user as the hemiplegic gait. Further, the processor 120 may be configured to provide information that the gait of the user is abnormal and/or information about the disease corresponding to the gait of the user. The information about the gait analysis result may not only be provided through a display or a speaker of the robot 100, but also through various external devices (e.g., a smart phone, a personal computer (PC), a tablet, etc.) communicating with the robot 100.

Figure 7:
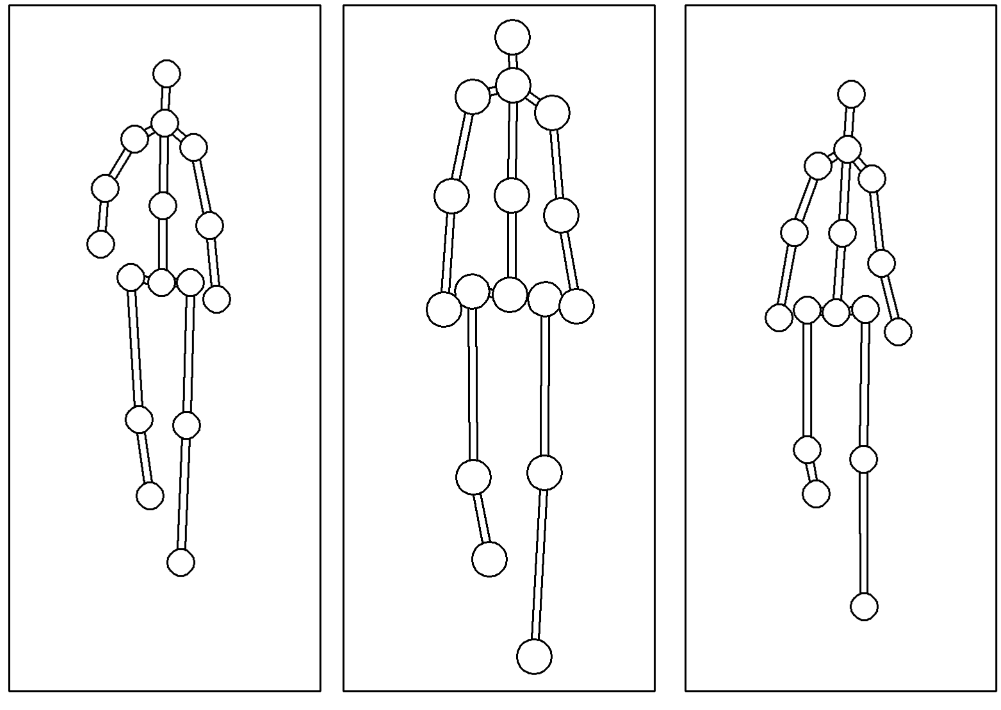
FIG. 7 is a diagram illustrating a virtual skeleton according to an embodiment.

FIG. 7 is a diagram illustrating a virtual skeleton according to an embodiment.

As described above, the processor 120 may be configured to determine whether a gait of the user is normal based on the plurality of parameter values of the plurality of parameters obtained through the gait analysis of the user.

However, this is one embodiment, and the processor 120 may be configured to determine whether it is the normal gait of the user based on a gait posture of the virtual skeleton. Here, the virtual skeleton may be generated through a 3D modeling program. Specifically, the 3D modeling program may be a program which performs outputting by rendering of the virtual skeleton generated based on the position of the plurality of points in a 3-dimensional virtual space using the point cloud data formed of the plurality of points as input data, and the processor 120 may be configured to apply the point cloud data obtained through the sensor 110 to the 3D modeling program and generate the virtual skeleton corresponding to the user.

Further, the processor 120 may be configured to obtain the plurality of parameter values of the plurality of parameters based on the gait posture of the virtual skeleton. Specifically, the processor 120 may be configured to obtain, through a movement analysis of the virtual skeleton, the plurality of parameter values of the plurality of parameters such as the swing segment, the stance segment, the stride segment, the moving distance corresponding to the swing segment, the moving distance corresponding to the stance segment, the stride, the moving trajectory of the legs, and the like.

Further, the processor 120 may be configured to compare the plurality of parameter values of the plurality of parameters obtained through the movement analysis of the virtual skeleton with information about the gait pattern which is pre-stored in the memory and determine whether the gait of the user is a normal gait or an abnormal gait.

Here, information of the pre-stored gait pattern may include information about the first gait pattern generated based on the gait analysis of the typical user and information about the second gait pattern generated based on the gait analysis of the user with a disease. Further, the information about the first gait pattern may include the plurality of parameter values corresponding to the plurality of parameters obtained based on the gait analysis of the typical user, and the information about the second gait pattern may include the plurality of parameter values corresponding to the plurality of parameters obtained based on the gait analysis of the user with the disease. Specifically, the information about the second gait pattern may include information about the plurality of parameter values corresponding to the respective diseases.

Further, the processor 120 may be configured to provide information about the gait analysis result. Specifically, the processor 120 may be configured to compare the plurality of parameter values corresponding to the plurality of parameters included in the information about the first gait pattern with the plurality of parameter values of the plurality of parameters obtained through the gait analysis of the user. Further, the processor 120 may be configured to determine, based on the plurality of parameter values corresponding to the plurality of parameters included in the information about the first gait pattern and the plurality of parameter values of the plurality of parameters obtained through the gait analysis of the user being determined as matching by a threshold value or more, the gait of the user as a normal gait, and provide information that the gait of the user is a normal gait. In addition, the processor 120 may be configured to compare the plurality of parameter values corresponding to the respective diseases included in the information about the second gait pattern with the plurality of parameter values of the plurality of parameters obtained through the gait analysis of the user, and determine the disease corresponding to the gait of the user. Further, the processor 120 may be configured to provide information that the gait of the user is abnormal and/or information about the disease corresponding to the gait of the user. The information about the gait analysis result may not only be provided through the display or the speaker of the robot 100, but also through various external devices (e.g., smart phone, PC, tablet, etc.) communicating with the robot 100. In addition, the processor 120 may be configured to provide an image including the virtual skeleton through the display of the robot 100 or a display of various external devices communicating with the robot 100.

The virtual skeleton may be generated based on the plurality of parameter values of the plurality of pre-obtained parameters. Specifically, the processor 120 may be configured to input the plurality of parameter values of the plurality of parameters such as the swing segment, the stance segment, the stride segment, the moving distance corresponding to the swing segment, the moving distance corresponding to the stance segment, the stride, the movement trajectory of the legs, and the like to the 3D modeling program, and generate the virtual skeleton. Further, the processor 120 may be configured to determine whether the gait of the user is a normal gait or an abnormal gait based on the gait pattern of the virtual skeleton. Specifically, the processor 120 may be configured to determine whether the gait of the user is a normal gait or an abnormal gait through a comparison of information about the pre-stored gait pattern with the gait pattern of the virtual skeleton.

The information about the pre-stored gait pattern may include first gait pattern information generated based on the gait analysis of the typical user and second gait pattern information generated based on the gait analysis of the user with a disease. Further, the processor 120 may be configured to determine, based on the gait pattern according to the first gait pattern information and the gait pattern of the virtual skeleton being determined as matching by a threshold value or more, the gait of the user as a normal gait, and determine, based on the gait pattern according to the second gait pattern information and the gait pattern of the virtual skeleton being determined as matching by a threshold value or more, the gait of the user as an abnormal gait. The processor 120 may be configured to determine the disease of the user based on the gait pattern of the virtual skeleton. Specifically, the second gait pattern information may include a plurality of pattern information corresponding to the respective diseases, and the processor 120 may be configured to determine the gait pattern which matches with the gait pattern of the virtual skeleton by a threshold value or more from among the plurality of patterns according to the second gait pattern information, and determine the disease matched to the corresponding gait pattern as the disease the user has.

Figure 8:
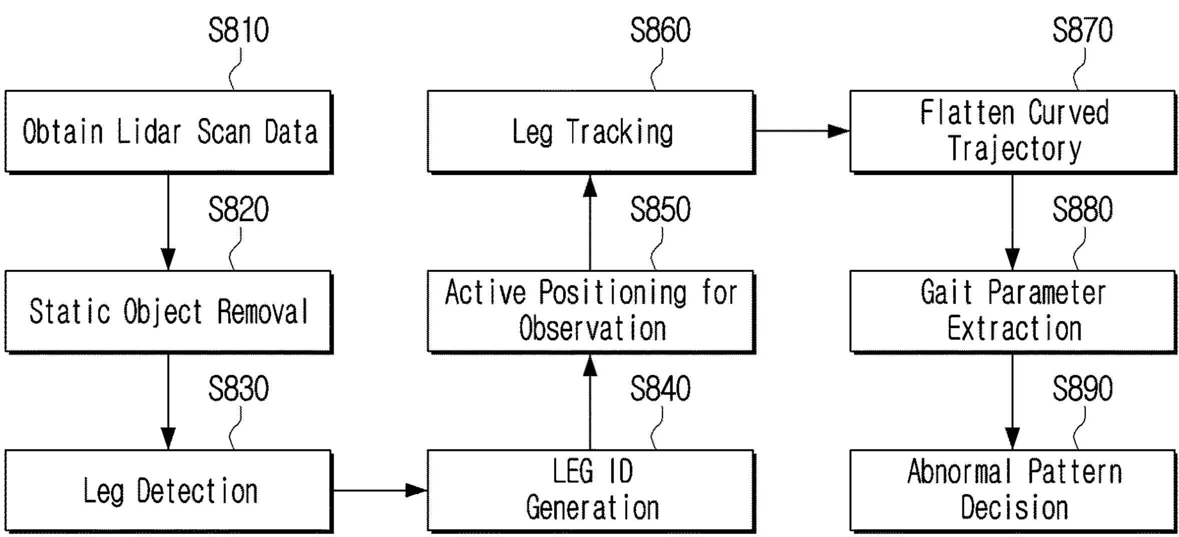
FIG. 8 is a flowchart illustrating a gait tracking method according to an embodiment.

FIG. 8 is a flowchart illustrating a gait tracking method according to an embodiment.

The processor 120 may be configured to obtain LIDAR scan data from the sensor 110 (S810). Here, the LIDAR scan data may be map data generated through the SLAM algorithm.

Further, the processor 120 may be configured to remove a static object from the LIDAR scan data (S820). Here, the static object may be an object, such as a wall, a shelf, a desk, or the like, and to this end, the processor 120 may be configured to store object information about the size, shape, and the like of the static object, identify the static object having the size and shape corresponding to the object information pre-stored in the LIDAR scan data, and remove the static object from the LIDAR scan data. Accordingly, the disclosure may prevent the problem of erroneously recognizing the static obstacle as the legs of the user in the step of identifying the legs of the user hereafter.

Figure 9:
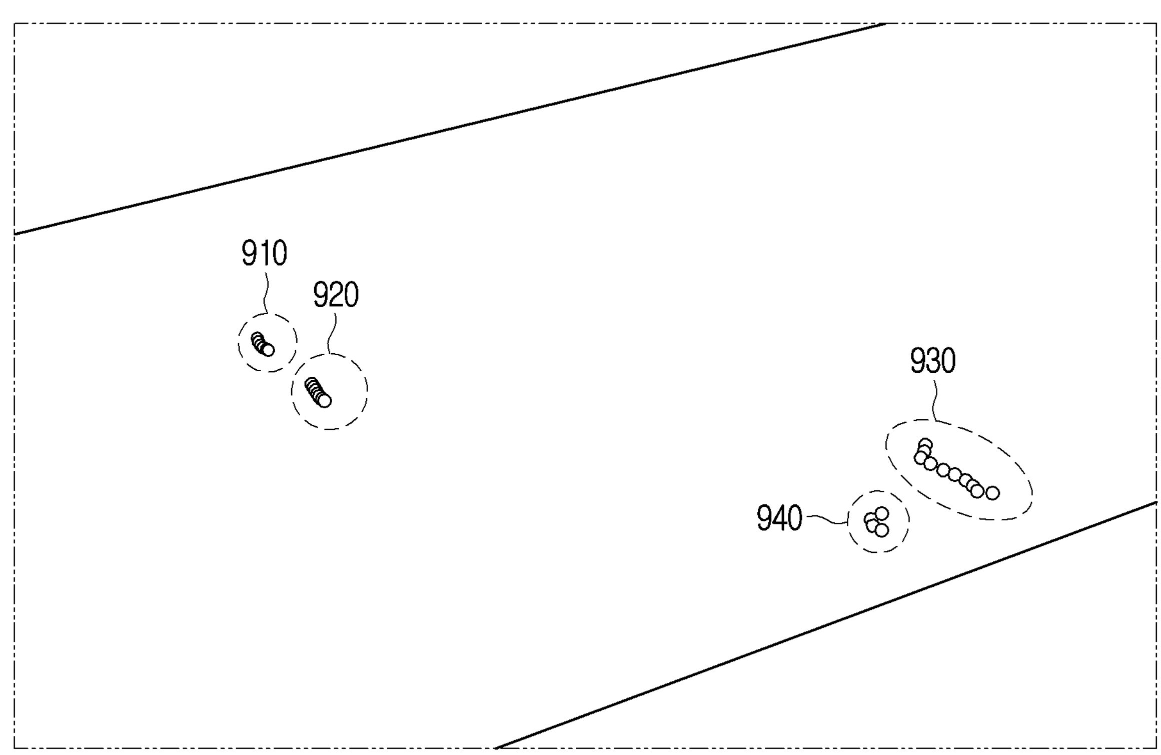
FIG. 9 is a flowchart illustrating identifying legs of a user according to an embodiment.

The processor 120 may be configured to detect the legs of the user from the LIDAR scan data (S830). To this end, the processor 120 may be configured to convert the LIDAR scan data to a point cloud library (PCL) type, and cluster the plurality of points included in the LIDAR scan data as at least one cluster. Specifically, the processor 120 may be configured to calculate distances between the respective points forming the LIDAR scan data, and cluster the plurality of points having a distance of less than or equal to a pre-set value as one cluster. As an example, referring to FIG. 9, the processor 120 may be configured to cluster the plurality of points included in the LIDAR scan data based on the distances between the respective points as a first cluster 910, a second cluster 920, a third cluster 930, and a fourth cluster 940.

The processor 120 may be configured to determine whether the obtained cluster is a cluster corresponding to a leg of the user. To this end, the processor 120 may be configured to calculate the score of the cluster based on the width of the cluster, the height of the cluster, and the aspect ratio of the cluster. Here, the score of the cluster may be a value corresponding to the similarity between the legs of an actual person and the cluster, and the processor 120 may be configured to compare the pre-stored leg information (here, information about an average width of legs, an average height of legs, and an average aspect ratio of legs of an actual person may be included) with the cluster information (here, information about the width of the cluster, the height of the cluster, and the aspect ratio of the cluster may be included), and calculate the score of the cluster based on the similarity of the pre-stored leg information with the cluster information. As an example, the more similar the width of the cluster, the height of the cluster, and the aspect ratio of the cluster are with the pre-stored average width of legs, the average height of legs, and the average aspect ratio of legs, the higher the processor 120 may calculate the score of the cluster. As an example, in FIG. 9, the processor 120 may be configured to calculate a high score of the first cluster 910 and the second cluster 920 which both have a shape similar to the pre-stored leg information, and calculate a low score of the third cluster 930 and the fourth cluster 940, each of which is not similar to the pre-stored leg information.

Further, the processor 120 may be configured to determine the cluster as the cluster corresponds to a leg of the user based on the score of the cluster being greater than or equal to a threshold value, and determine the cluster as not corresponding to a leg of the user based on the score of the cluster being less than a threshold value. As an example, in FIG. 9, the processor 120 may be configured to determine the first cluster 910 and the second cluster 920, each having a score of greater than or equal to a threshold value, as clusters corresponding to the user, and determine the third cluster 930 and the fourth cluster 940, each having a score of less than a threshold value, as clusters which do not correspond to the legs of the user.

The processor 120 may be configured to then calculate a center point between the first cluster 910 and the second cluster 920, which are the clusters corresponding to the user. Here, the center point between the first cluster 910 and the second cluster 920 may be obtained by, as an example, calculating the distance between the plurality of points forming the cluster and an arbitrary center point k through the L2 Distance algorithm described above, and repeatedly performing the calculation until the distance between the point calculated for the respective points and the center point k is converged to a certain value. Through the above, the processor 120 may be configured to obtain a center point k1 of the first cluster 910 and a center point k2 of the second cluster 920.

Figure 10:
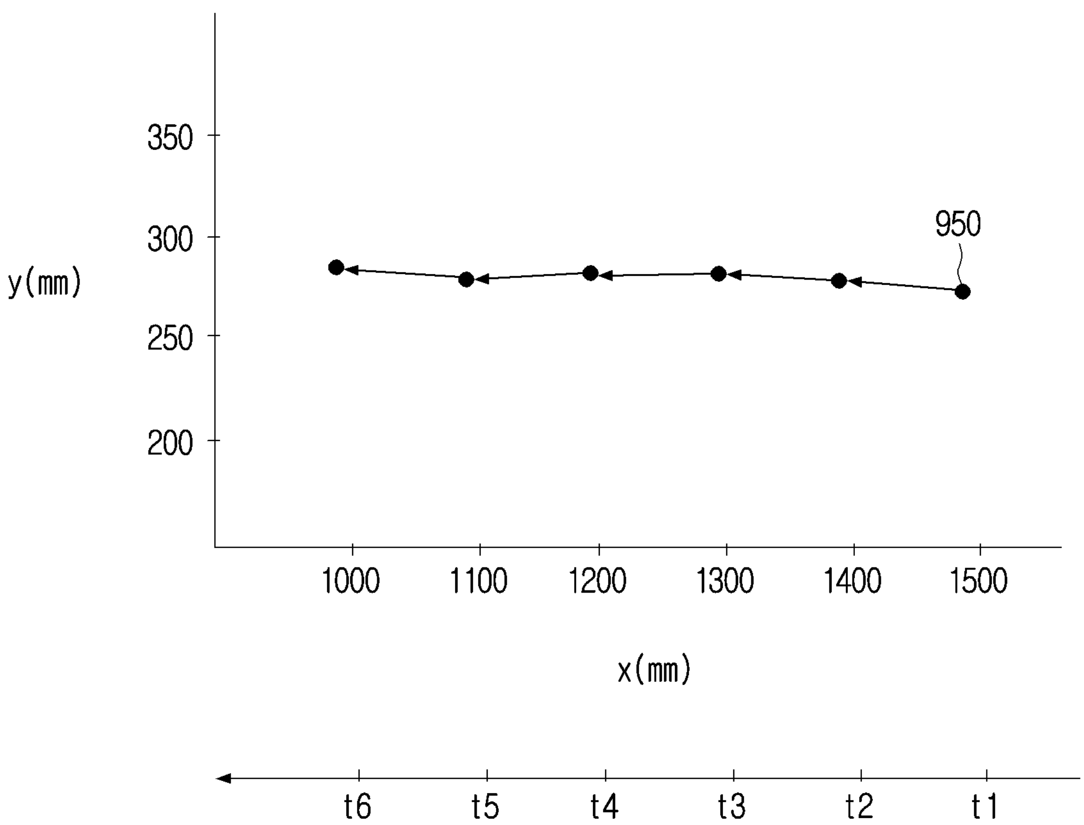
FIG. 10 is a diagram illustrating identifying a left leg and a right leg of a user based on a movement direction of the user according to an embodiment.

Further, the processor 120 may be configured to calculate a center point A1 between the center point k1 and the center point k2, and allocate a person ID (e.g., Person_1) to the center point A1. Here, the center point A1 may be calculated through a repeat application of the L2 Distance algorithm similarly with the method of calculating the center point k of the cluster described above. Further, the processor 120 may be configured to track the movement of the center point A1, and obtain data including position information of the center point A1. As an example, the processor 120 may be configured to track the movement of the center point A1, and obtain data including position information of the center point A1 for the respective times as in FIG. 10.

The processor 120 may be configured to identify one from among the first cluster 910 and the second cluster 920 as the left leg of the person ID based on a progression direction of the center point A1, and identify the remaining other as the right leg of the person ID.

Specifically, the processor 120 may be configured to determine the progression direction of the center point A1 based on the position of the center point A1 which is changed according to the movement of the user, determine the cluster positioned at the left side of the center point A1 based on the progression direction as the cluster corresponding to the left leg of the user, and determine the cluster positioned at the right side of the center point A1 as the cluster corresponding to the right leg of the user. As an example, based on data being obtained as in FIG. 10, the processor 120 may be configured to determine that the user is moving toward the robot 100. That is, the processor 120 may be configured to determine the progression direction of the center point A1 as the direction toward the robot 100. In this case, the processor 120 may be configured to determine the first cluster 910 positioned at the left side of the center point A1 based on the progression direction of the center point A1 as the cluster corresponding to the left leg of the user, and determine the second cluster 920 positioned at the right side of the center point A1 as the cluster corresponding to the right leg of the user.

Further, the processor 120 may be configured to allocate Leg ID: Left to the first cluster 910 corresponding to the left leg of the user, and allocate Leg ID: Right to the second cluster 920 corresponding to the right leg of the user.

Figure 11A:
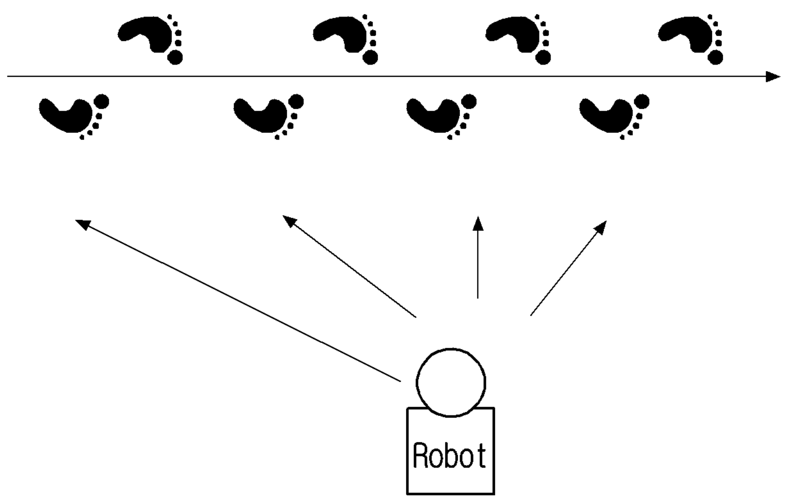
FIG. 11A is a diagram illustrating an example of tracking legs of a user from one side of the user.
Figure 11B:
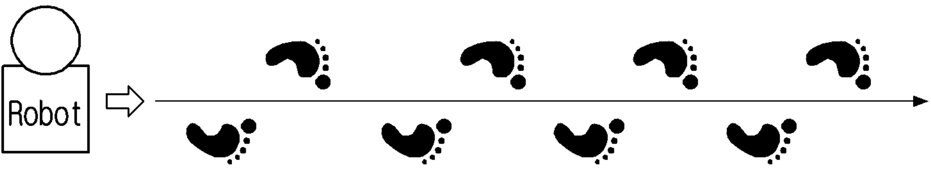
FIG. 11B is a diagram illustrating an example of tracking legs of a user from a front or back of the user by moving in a direction that corresponds to a movement direction of the user.
Figure 11B:
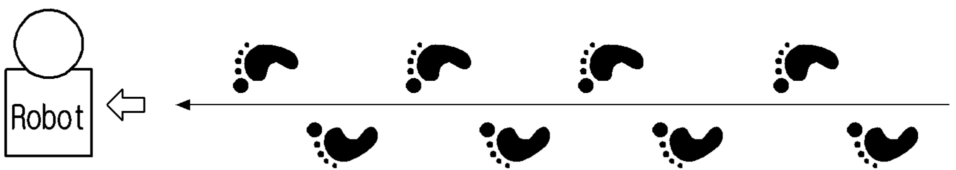

The processor 120 may be configured to then track the first cluster 910 corresponding to the left leg and the movement of the second cluster 920 corresponding to the right leg of the user Person_1 allocated with an ID as in FIG. 11B.

Specifically, the processor 120 may be configured to determine an optimal position for observing the legs of the user (S850), and track the leg movement of the user while controlling the travelling unit 130 so that the robot 100 is moved to the corresponding position (S860).

As an example, referring to FIG. 11A, based on obtaining gait data by tracking the legs of the user from the side of the user, obtaining data suitable for gait analysis may be difficult because one of the user's legs is hidden by the leg relatively closer with the robot 100. For example, as shown in FIG. 11A, the user's right leg may obstruct the user's left leg. Accordingly, the processor 120 may be configured to determine, as illustrated in FIG. 11B, the position at which gait data may be obtained. For example, the processor 120 may control the robot 100 to move in the same direction as the movement direction of the user, and the position may be behind the user or in front of the user, and the processor 120 may control the travelling unit 130 so that the robot 100 is moved to the corresponding position, and may then move together with the user.

Specifically, the processor 120 may be configured to identify, based on map data being generated based on the SLAM algorithm described above, the untravellable area (e.g., area in which obstacles such as wall surface and furniture are positioned) and the travelable area in the map data, and set the positions corresponding to a pre-set distance from the user who is the subject of observation from among a plurality of areas included in the map data as the set of reference points P (P1, P2, . . . , Pn). Here, the user may correspond to the center point A1 described above, and the pre-set distance may be the minimum distance to which the distance may be detected through the sensor 110, and as an example, based on the sensor 110 being realized as a sensor capable of detecting an object positioned at a distance of greater than or equal to 1 m, the pre-set distance may be 1 m.

Further, the processor 120 may be configured to allocate a cost to the plurality of nodes included in the map data. Here, the plurality of nodes may be the plurality of points forming the travelable area included in the map data. Specifically, the processor 120 may be configured to calculate the shortest distance d from the set of reference points P (P1, P2, . . . , Pn) to the respective nodes, and allocate the cost of the node with a small distance d value to be lower than the cost of the node with a large distance d value.

The processor 120 may be configured to allocate, based on there being a node incapable of observing the user because of an obstacle from the plurality of nodes, the maximum cost to the corresponding node. Specifically, the processor 120 may be configured to determine the position of the obstacle based on position information about the obstacle obtained in the map data generating process, and based on determining that the obstacle is positioned between the node and the user, determine the corresponding node as the node which is incapable of observing the user and allocate the maximum cost.

In addition, the processor 120 may be configured to reallocate, based on initially allocating the same cost to the plurality of nodes, the minimum cost to the node of the relatively closest point from the current position of the robot 100 from among the plurality of nodes.

Further, the processor 120 may be configured to set the position at which the minimum cost is allocated from among the plurality of nodes as the target position of the robot 100, and control the travelling unit 130 to move the robot 100 to the corresponding position.

Through the above, the processor 120 may be configured to control the robot 100 to move to the position corresponding to the node allocated with the minimum cost, and track the legs of the user. Accordingly, the robot 100 may be configured to obtain gait data from the position which is a straight-line from the user.

From among the plurality of points in the surroundings, the robot 100 may be configured to obtain gait data corresponding to the user while dynamically travelling to the position capable of tracking the legs of the user.

The processor 120 may be configured to predict, in terms of tracking the user, the movement of the user through the Kalman filter, and control the travelling unit 130 to track the user by moving the robot 100 based on the predicted movement of the user. Here, the Kalman filter may be a filter which estimates the position of the user at a specific point-in-time based on the position of the user at a previous point-in-time.

Specifically, the processor 120 may be configured to obtain the state vector corresponding to the position of the user at a future point-in-time by applying the Kalman filter to the state vector corresponding to the position of the user at the current point-in-time. Further, the processor 120 may be configured to allocate a cost to the respective nodes in the map data based on the position of the user at the future point-in-time determined based on the obtained state vector.

Specifically, the processor 120 may be configured to predict the movement direction of the user based on the position of the user at the future point-in-time, and allocate the minimum cost to the node positioned in the same direction as with the movement direction of the user from among the plurality of nodes determined based on the set of reference points P (P1, P2, . . . , Pn). That is, the processor 120 may be configured to allocate the minimum cost to the node with a viewpoint for tracking the legs of the user while moving in the same direction as with the movement direction of the user from behind the user or the node with a viewpoint for tracking the legs of the user while moving in the same direction as with the movement direction of the user from the front of the user.

Further, the processor 120 may be configured to set the node allocated with the minimum cost as a next target position of the robot 100, and control the travelling unit 130 to move the robot 100 to the corresponding position.

Accordingly, the robot 100 of the disclosure may be configured to obtain gait data while moving in the same direction as with the movement direction of the user from behind the user, or obtain gait data while moving in the same direction as with the movement direction of the user from the front of the user.

The processor 120 may be configured to convert, based on the trajectory obtained through tracking to the legs of the user being a curved trajectory, the curved trajectory to a straight-line trajectory (S870). As an example, the processor 120 may be configured to divide the curved trajectory obtained through tracking the legs of the user into a plurality of lines, and convert the curved trajectory to the straight-line trajectory by applying a Taylor algorithm to the respective lines. The above is one embodiment, and the disclosure may enable straight-lining of curved trajectories through various algorithms for the approximation of the curved trajectory to the straight-line in addition to the Taylor algorithm.

The processor 120 may be configured to obtain, through gait data obtained through tracking the legs of the user, the parameter value of the gait parameter. As an example, the processor 120 may be configured to obtain the parameter value on the various gait parameters such as the swing segment, the stance segment, the stride segment, the moving distance corresponding to the swing segment, the moving distance corresponding to the stance segment, the stride, the cadence, the step time, the movement trajectory of the legs, and the like through the gait data analysis.

The processor 120 may be configured to determine whether the gait of the user is a normal gait or an abnormal gait based on the parameter value of the obtained gait parameter (S890). Specifically, the processor 120 may be configured to determine whether the gait of the user is a normal gait or an abnormal gait based on comparing the information about the gait pattern pre-stored in the memory with the parameter value of the obtained gait parameter.

Alternatively, the processor 120 may be configured to generate a virtual skeleton corresponding to the user, and determine whether it is the normal gait of the user based on the gait posture of the virtual skeleton. Here, the virtual skeleton may be generated through the 3D modeling program. Specifically, the 3D modeling program may be a program which performs outputting by rendering of the virtual skeleton generated based on the position of the plurality of points in a 3-dimensional virtual space using the point cloud data formed of the plurality of points as input data, and the processor 120 may be configured to apply the point cloud data obtained through the sensor 110 to the 3D modeling program and generate the virtual skeleton corresponding to the user.

Further, the processor 120 may be configured to obtain the plurality of parameter values of the plurality of parameters based on the gait posture of the virtual skeleton. Specifically, the processor 120 may be configured to obtain, through the movement analysis of the virtual skeleton, the plurality of parameter values of the plurality of parameters such as the swing segment, the stance segment, the stride segment, the moving distance corresponding to the swing segment, the moving distance corresponding to the stance segment, the stride, the moving trajectory of the legs, and the like.

Further, the processor 120 may be configured to compare the plurality of parameter values of the plurality of parameters obtained through the movement analysis of the virtual skeleton with information about the gait pattern which is pre-stored in the memory and determine whether the gait of the user is a normal gait or an abnormal gait. Because the detailed method on whether it is a normal gait or an abnormal gait has been described above, the detailed description will be omitted here.

The processor 120 may be configured to then provide information that the gait of the user is abnormal and/or information about the disease corresponding to the gait of the user. Here, the information about the gait analysis result may not only be provided through the display or the speaker of the robot 100, but also through various external devices (e.g., smart phone, PC, tablet, etc.) communicating with the robot 100.

Figure 12:
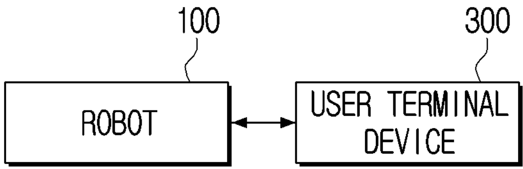
FIG. 12 is a diagram illustrating a robot system including a user terminal device according to an embodiment.

FIG. 12 is a diagram illustrating a robot system according to an embodiment.

Referring to FIG. 12, the robot system according to an embodiment of the disclosure may include the robot 100 and a user terminal device 300. Here, the user terminal device 300 may be, for example, a smart phone, a tablet, or other electronic device, such as a wearable device wearable on the body of the user.

According to an embodiment, the robot 100 may be configured to communicate with the user terminal device 300 through a communication interface. Here, the communication interface may include a Bluetooth module, a WI-FI module, or a mobile communication module, but is not necessarily limited thereto.

The processor 120 may be configured to receive detection data from the user terminal device through the communication interface. Here, as data generated by a sensor of the user terminal device 300, it may be, as an example, acceleration data or the like measured by an acceleration sensor of the user terminal device 300. However, this is one embodiment, and the detection data may be various data capable of detecting the movement of the user such as acceleration data or the like measured by a gyro sensor of the user terminal device 300.

The processor 120 may be configured to determine whether a gait is the normal gait of the user taking into consideration the detection data received from the user terminal device 300 in addition to the gait data obtained through the sensor 110. As an example, the processor 120 may be configured to determine the gait acceleration of the user based on acceleration information included in the detection data, and determine whether it is the normal gait of the user by comparing the gait acceleration of the user and a pre-stored average gait acceleration.

In addition, the processor 120 may be configured to receive identification information of the user terminal device 300 by communicating with the user terminal device 300, and identify the user who is the tracking subject as the user corresponding to the identification information of the user terminal device 300. As an example, the robot 100 may be configured to store user information which matches the identification information of the user terminal device. Further, the processor 120 may be configured to identify, based on identification information of the user terminal device 300 being received from the user terminal device 300, the user corresponding to the user terminal device 300 based on the user information matched to the identification information of the user terminal device, and store gait data obtained through tracking the legs as gait data of the identified user.

The processor 120 may be configured to transmit information about the gait analysis result obtained through the gait data analysis to the user terminal device 300 through the communication interface. Here, the information about the gait analysis result may include the gait posture of the user, disease information determined according to the gait of the user, and the like.

Accordingly, through communication with the user terminal device 300, the robot 100 of the disclosure may increase accuracy in gait analysis, and accumulate and store gait data that respectively corresponds to multiple users. In addition, the gait of the user and related information may be provided through the display of the user terminal device, and the user may easily check the gait posture of user and whether abnormality of the gait of the user.

Figure 13:
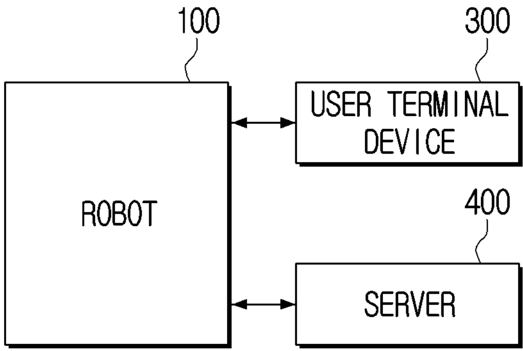
FIG. 13 is a diagram illustrating a robot system including a user terminal device and a server according to an embodiment.

As illustrated in FIG. 13, the robot system according to an embodiment may include the robot 100, the user terminal device 300 and a server 400.

In this case, the processor 120 may be configured to transmit gait data obtained through tracking the legs of the user to the server 400, and the sever 400 may be configured to store the gait data received from the robot 100. Because the server 400 may be configured to store data of a large capacity, the processor 120 may be configured to analyze the change in gait posture of the user (or users) for the respective periods, based on the gait data of the user which is accumulated and stored in the server 400.

FIG. 14A is a block diagram illustrating in detail a robot according to an embodiment.

Referring to FIG. 14A, the robot 100 according to an embodiment may include a sensor 110, a travelling unit 130, an operating unit 140, a memory 150, a display 160, a communication interface 170, and a processor 120.

The above is one embodiment, and the robot 100 may be realized excluding some components from among the plurality of components described above, and may be implemented further including additional components in addition to the plurality of components described above. Parts overlapping with the descriptions described above will be omitted or described in short below.

The operating unit 140 may include, for example, one or more mechanical manipulators, such as a robot arm and a robot hand. Here, the robot arm and the robot hand may be connected through a connector, and the robot art may be configured to perform a 3-dimensional movement, a rotation, or the like according to the driving of a first motor connected to the robot arm. Further, the robot hand may be configured to perform a 3-dimensional movement, a rotation, a grip, or the like according to the driving of a second motor connected to the robot hand.

The memory 150 may be configured to store an operating system (OS) for controlling the overall operation of the elements of the robot 100 and instructions or data associated with the elements of the robot 100.

Accordingly, the processor 120 may be configured to use various instructions, data, or the like stored in the memory 150 to control the various hardware or software elements of the robot 100, load and process the instruction or data received from at least one from among the other elements in a volatile memory, and store various data in a non-volatile memory.

As an example, the memory 150 may be stored with map data generated by the sensor 110. In addition, the memory 150 may be stored with leg information. Here, information about the average width of legs, the average height of legs, and the average aspect ratio of legs of an actual person may be included. In addition, the memory 150 may be configured to store information about the gait pattern. Here, the information about the gait pattern may include information about the first gait pattern generated based on the gait analysis of the typical user and information about the second gait pattern generated based on the gait analysis of the user with a disease such as Parkinson's, hemiplegia, and the like. Further, the information about the first gait pattern may include the plurality of parameter values corresponding to the plurality of parameters obtained based on the gait analysis of the typical user, and information about the second gait pattern may include the plurality of parameter values corresponding to the plurality of parameters obtained based on the gait analysis of the user with a disease. Specifically, the information about the second gait pattern may include information about the plurality of parameter values corresponding to the respective disease. Specifically, the information about the second gait pattern may include information about the plurality of parameter values corresponding to the respective diseases.

The display 160 may be configured to display various screens. For example, the display 160 may be configured to display map data generated by the sensor 110. In addition, the display 160 may be configured to display information about the gait result. As an example, the display 160 may be configured to display the plurality of parameter values of the plurality of parameters obtained based on the gait analysis or the information about the diseases determined based on the gait analysis.

The display 160 may be implemented as a display of a liquid crystal display (LCD) panel form. However, embodiments are not limited thereto, and the display 160 may be implemented as, for example, and without limitation, a light emitting diode (LED), an organic light emitting diodes (OLED), a liquid crystal on silicon (LCoS), a digital light processing (DLP), and the like. In addition, in the display 160, a driving circuit, which may be implemented in the form of an A—Si TFT, a low temperature poly silicon (LTPS) TFT, an organic TFT (OTFT), or the like, a backlight, and the like may also be included.

In addition, the display 160 may be implemented as a touch screen coupled with touch detection circuitry.

The communication interface 170 may be configured to perform communication with an external device. For example, the communication interface 170 may be configured to perform communication with various external devices through a wireless communication method such as, for example, and without limitation, Bluetooth (BT), Bluetooth Low Energy (BLE), Wireless Fidelity (WI-FI), ZigBee, and the like or through an Infrared (IR) communication method. The communication interface 170 may not only be mounted to the processor 120, but also included in the robot 100 as a separate component.

The robot 100 according to an embodiment may further include various components in addition to the components described above.

As an example, the robot 100 may further include an input interface capable of receiving user input. Here, the input interface may be realized as a button or a touch screen, and may be configured to receive various user commands such as a user command for detecting the distance with the object or a user command for moving the robot 100.

In addition, the robot 100 may further include a speaker capable of outputting various audio data.

In addition, the robot 100 may further include a microphone for receiving a voice of the user. Here, the user voice may be a user voice for executing a task of the robot 100, or the like.

Figure 14B:
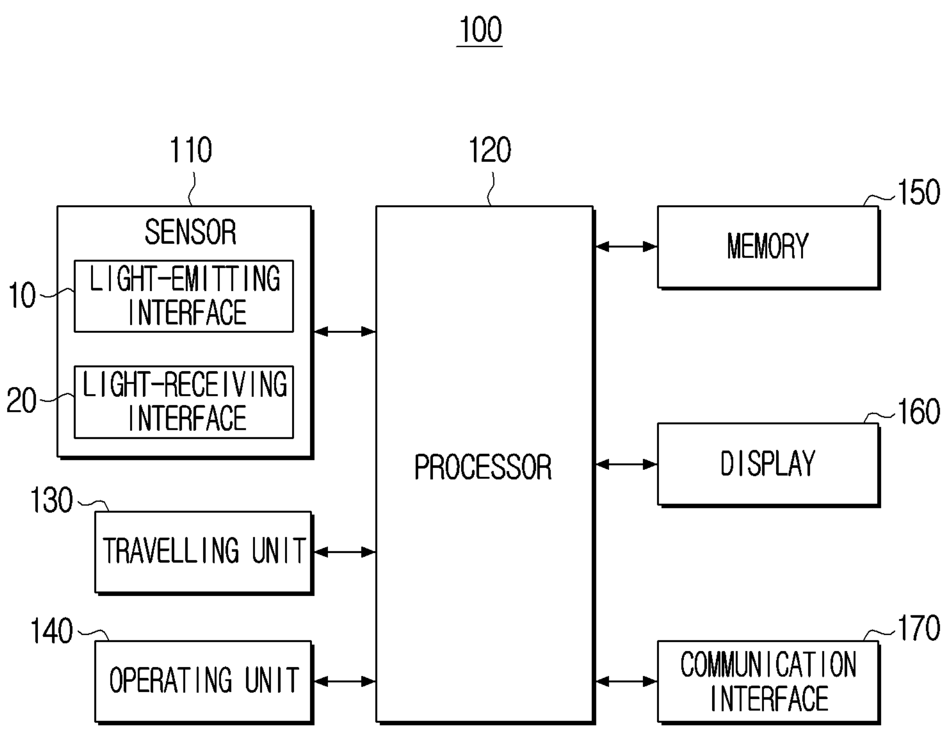
FIG. 14B is a block diagram illustrating a robot according to embodiment.

In FIG. 14A, although the sensor 110 is illustrated as including the MCU 30, the sensor 110 according to an embodiment may include the light-emitting interface 10 and the light-receiving interface 20 as illustrated in FIG. 14B, and a function of the MCU 30 described above may be performed by the processor 120. In this case, the light-emitting interface 10 may be configured to radiate light based on a control signal received from the processor 120, and the processor 120 may be configured to determine, based on the time until the light radiated by the light-emitting interface 10 is reflected by the object and received in the light-receiving interface 20, the distance between the sensor 110 and the object.

Figure 15:
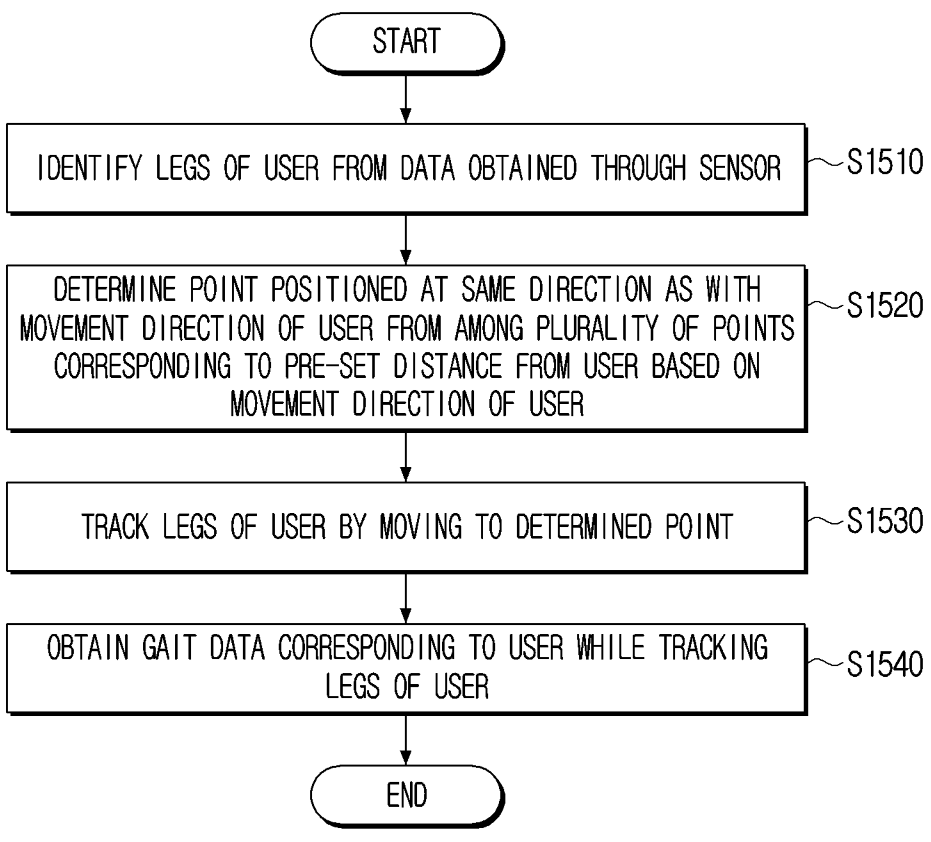
FIG. 15 is a flowchart illustrating a control method of a robot according to an embodiment.

FIG. 15 is a flowchart illustrating a control method of a robot according to an embodiment.

The robot 100 may be configured to identify the legs of the user from the data obtained through the sensor (S1510). Specifically, the robot 100 may be configured to calculate the distance between the plurality of points included in the data obtained through the sensor, and cluster the plurality of points having a distance of less than or equal to a pre-set value as one cluster. Further, the robot 100 may be configured to determine, based on at least one cluster being obtained, whether the obtained cluster corresponds to a leg of the user. To this end, the robot 100 may be configured to calculate the score of the cluster based on the width of the cluster, the height of the cluster, and the aspect ratio of the cluster. Further, the robot 100 may be configured to determine, based on the score of the cluster being greater than or equal to a threshold value, the cluster corresponds to a leg of the user, and calculate the center point of the corresponding cluster. As an example, the robot 100 may be configured to obtain the first cluster corresponding to one from among the left leg or the right leg of the user and the second cluster corresponding to the remaining leg, and obtain the center point k1 of the first cluster and the center point k2 of the second cluster. Further, the robot 100 may be configured to calculate the center point A1 between the center point k1 and the center point k2, and determine the progression direction of the center point A1 based on the position of the center point A1 which may be changed according to the movement of the user. Further, the robot 100 may be configured to determine the cluster positioned at the left side of the center point A1 based on the progression direction as the cluster corresponding to the left leg of the user, and determine the cluster positioned at the right side of the center point A1 as the cluster corresponding to the right leg of the user.

The robot 100 may be configured to determine the point positioned in the same direction as with the movement direction of the user from among the plurality of points corresponding to a pre-set distance from the user based on the movement direction of the user (S1520). Specifically, the robot 100 may be configured to predict the movement of the user through the Kalman filter, and determine the movement direction of the user based on the current position of the user and the predicted movement of the user. Further, the robot 100 may be configured to determine the point positioned in the same direction as with the movement direction of the user from among the plurality of points corresponding to the pre-set distance from the user.

Further, the robot 100 may be configured to track the legs of the user by moving to the determined point (S1530), and obtain gait data corresponding to the user while tracking the legs of the user (S1540). Based on obtaining gait data of the user from the side, data suitable for gait analysis may be difficult to obtain because the remaining leg is hidden by the leg relatively closer with the robot 100 and thus, the robot 100 may obtain optimal data for gait analysis.

The methods according to the various embodiments of the disclosure described above may be implemented in the form of a software or an application installable in an electronic device.

In addition, the methods according to the various embodiments of the disclosure described above may be implemented through a software upgrade or a hardware upgrade on an electronic device.

In addition, the various embodiments of the disclosure described above may also be performed through an embedded server provided in the electronic device, or a server outside of the electronic device.

A non-transitory computer readable medium stored with a program configured to sequentially perform the control method of the electronic device according to the embodiments may be provided.

The non-transitory computer readable medium may refer to a medium that stores data semi-permanently rather than storing data for a very short time, such as a register, a cache, a memory, or the like, and is readable by a device. Specifically, the above-described various applications or programs may be stored and provided in the non-transitory computer readable medium such as, for example, and without limitation, a compact disc (CD), a digital versatile disc (DVD), a hard disc, a Blu-ray disc, a USB, a memory card, a ROM, and the like.

While the disclosure has been illustrated and described with reference to various embodiments thereof, it will be understood that the various embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A robot comprising:

a sensor;

a motor; and a processor configured to:

identify a user position of a user based on data obtained through the sensor, wherein the user is a subject of observation;

obtain a Voronoi Diagram by applying a thinning algorithm to map data obtained through the sensor;

identify a plurality of positions located a pre-set distance from the user position, each of the plurality of positions being provided along a circle having a center corresponding to the user position, wherein the robot is located outside of the circle;

identify a node from among a plurality of nodes of the Voronoi Diagram based on a movement direction of the user, distances between the plurality of nodes and the plurality of positions, and whether an obstacle is present between the user and any of the plurality of nodes;

control the motor to move the robot to a position corresponding to the identified node; and obtain gait data corresponding to the user based on the data obtained through the sensor while tracking legs of the user, wherein the processor is configured to identify, based on identifying that the obstacle is positioned between the robot and a first node, a second node at which the obstacle is not positioned between the robot and the second node, from among the plurality of nodes, based on the movement direction of the user, and distances between the plurality of nodes and the plurality of positions, and control the motor to move the robot to the identified second node.

2. The robot of claim 1, wherein the processor is configured to predict a next user position of the user by applying a Kalman filter to the user position, and identify the movement direction of the user based on the user position and the predicted next user position.

3. The robot of claim 1, wherein the processor is configured to:

identify the movement direction of the user based on the data obtained through the sensor;

identify a left leg of the user based on the movement direction; and identify a right leg of the user based on the movement direction.

4. The robot of claim 1, wherein the processor is configured to:

identify the node based on the movement direction and a direction to the node being a same direction;

control the motor to move the robot in the movement direction; and obtain the gait data while controlling the motor to move the robot in the movement direction.

5. The robot of claim 1, wherein the processor is configured to:

generate a virtual skeleton by applying a 3D modeling program to the data corresponding to the user obtained from the sensor; and obtain the gait data of the user based on a gait posture of the virtual skeleton.

6. The robot of claim 1, wherein the processor is configured to:

identify a plurality of parameter values of a plurality of parameters based on the gait data;

compare the plurality of parameter values with information about a plurality of gait patterns corresponding to a plurality of pre-stored diseases;

obtain disease information corresponding to a gait of the user; and provide the disease information.

7. The robot of claim 1, wherein the robot is offset from the user position.

8. The robot of claim 1, wherein the identified position is closer to the user position that an initial position of the robot.

9. A method of controlling a robot, the method comprising:

identifying a user position of a user based on data obtained through a sensor, wherein the user is a subject of observation;

applying a thinning algorithm to map data obtained through the sensor to obtain a Voronoi Diagram;

identifying a plurality of positions located a pre-set distance from the user position, each of the plurality of positions being provided along a circle having a center corresponding to the user position, wherein the robot is located outside of the circle;

identifying a node from among a plurality of nodes of the Voronoi Diagram based on a movement direction of the user, distances between the plurality of nodes and the plurality of positions, and whether an obstacle is present between the user and any of the plurality of nodes;

controlling the robot to move to a position corresponding to the identified node; and obtaining gait data corresponding to the user based on the data obtained through the sensor while tracking legs of the user, wherein the method further comprises:

identifying, based on identifying that the obstacle is positioned between the robot and a first node, a second node at which the obstacle is not positioned between the robot and the second node, from among the plurality of nodes, based on the movement direction of the user, and distances between the plurality of nodes and the plurality of positions; and controlling the robot to the identified second node.

10. The method of claim 9, further comprising:

applying a Kalman filter to the user position to predict a next user position of the user; and identifying the movement direction of the user based on the user position and the predicted next user position.

11. The method of claim 9, further comprising:

identifying the movement direction of the user based on the data obtained through the sensor;

identifying a left leg of the user based on the movement direction; and identifying a right leg of the user based on the movement direction.

12. The method of claim 9, further comprising:

identifying the node based on the movement direction and a direction to the node being a same direction;

controlling the robot to move in the movement direction; and obtaining the gait data while controlling the robot to move in the movement direction.

13. The method of claim 9, further comprising:

applying a 3D modeling program to the data corresponding to the user that is obtained from the sensor to generate a virtual skeleton; and obtaining the gait data of the user based on a gait posture of the virtual skeleton.

* * * * *